Patented Dec. 18, 1951

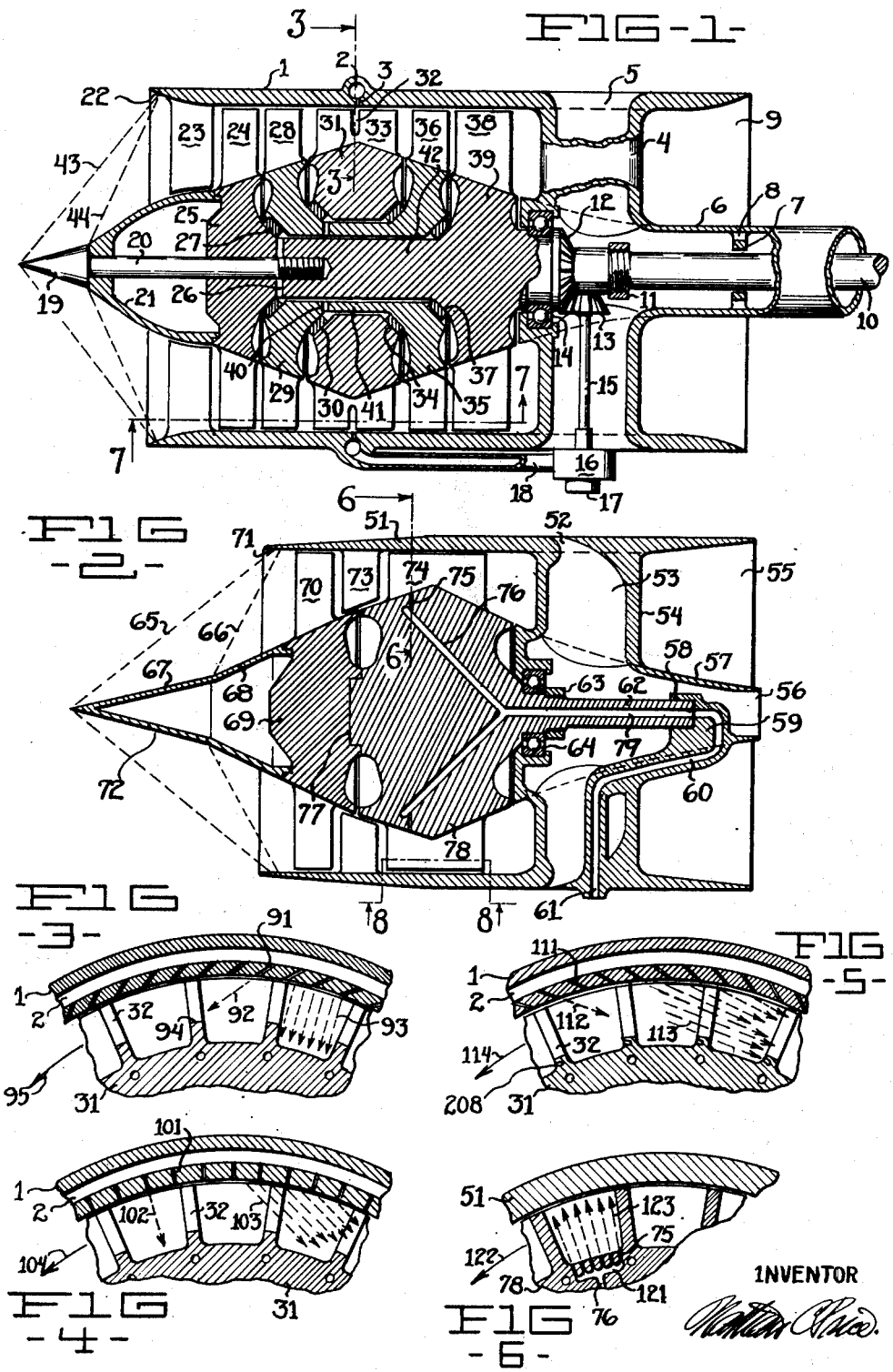

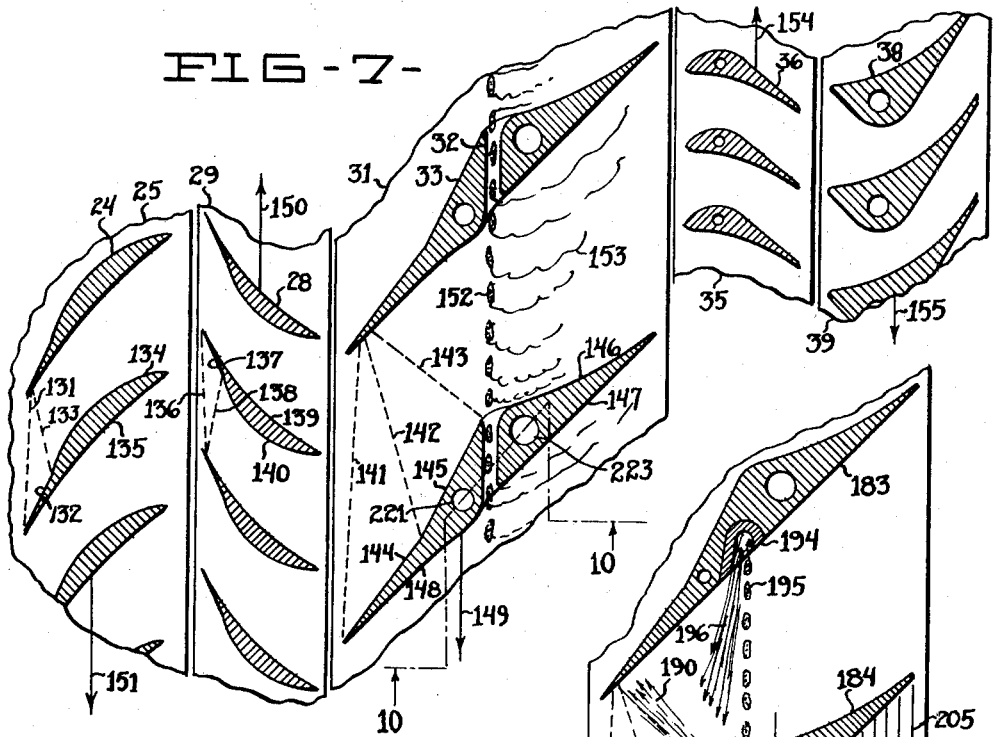
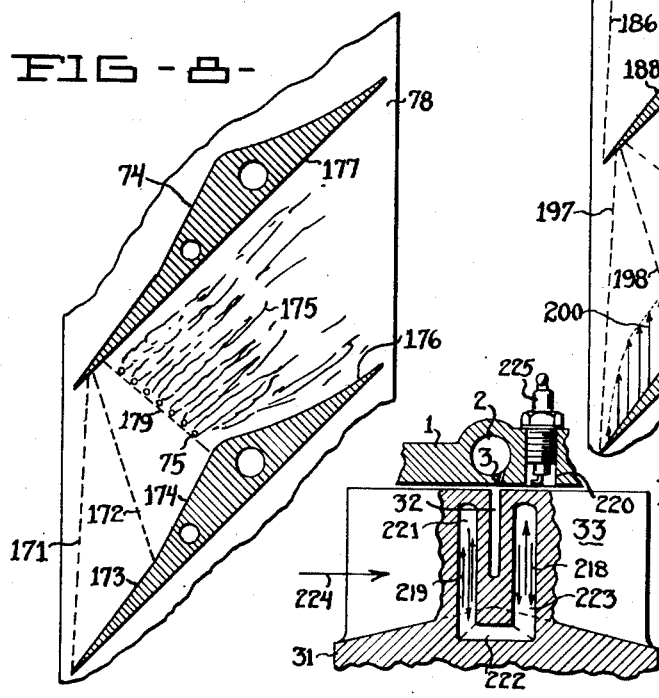
FIG-7-
FIG-8-
FIG-9-
FIG-10-

2,579,049

UNITED STATES PATENT OFFICE 2,579,049

ROTATING COMBUSTION PRODUCTS GENERATOR AND TURBINE OF THE CONTINUOUS COMBUSTION TYPE

Nathan C. Price, St. Helena, Calif.

Application February 4, 1949, Serial No. 74,663

13 Claims. (Cl. 60—39.35)

The present invention relates to a new type of supersonic gas turbine utilizing a multiple system of oblique air shock waves regulated by a screen-like injection of fuel at extremely high pressure, directly into the air stream in the blading of the machine.

The invention may be applied, among other cases, in situations requiring shaft power where a very low weight and minimum capital investment is sought, as well as in the field of supersonic aircraft operating up to and beyond the range of speeds which have heretofore been considered practical for conventional turbo-jets. The invention performs in a single vane row of novel characteristics the function which have previously required three separate and distinct components, namely, the compressor vanes, combustion chamber, and turbine buckets.

The invention accordingly eliminates the combustion chamber in the customary sense, while combining a method of producing self-ignition of the fuel without recourse to an electrical system, and bringing about a positive control of supersonic flow in the blading.

It is an object of the invention to generally simplify and reduce the cost of the gas turbine type of machine, while maintaining a high degree of performance and flexibility.

It is a further objective to eliminate the requirement for separate vanes for performing compression and expansion of the working fluid.

It is another objective to eliminate the combustion chamber as a separate component.

It is a still further objective to provide a self-igniting system for combustion of the fuel, and a method of intensifying the rate of chemical combination of fuel with air.

It is a still further objective of the invention to attain the utmost dispersion of the fuel within the air stream in a state conducive to nearly instantaneous chemical combination.

It is an object of the invention to provide a more efficient type of flow passage for supersonic compression of the inducted air and for the subsequent expansion thereof to produce power.

It is an object of the invention to furnish a simple method of controlling the position of compressive shock waves of the air inducted within the gas turbine.

It is an objective to provide a gas turbine structure requiring a minimum of space and weight for the power produced.

It is an objective to provide a power plant structure which is suitable for operation at translational speeds which have heretofore been considered beyond the scope of turbo-jets.

It is an object of the invention to avoid the sharp characteristics of speed vs. efficiency which have been considered inherent with several stages of supersonic blading operating together.

These and other objects and features of novelty will become evident hereinafter in the description, which, together with the following drawings illustrate preferred embodiments of the invention.

Figure 1 is a section of a version of the invention for production of shaft power, along the main axis thereof.

Figure 2 is a section of a version of the invention for jet propulsion in supersonic flight, along the main axis thereof.

Figure 3 is a fragmentary cross section on the line 3—3 of Figure 1 showing a method of fuel injection.

Figure 4 is a fragmentary cross section of the line 3—3 of Figure 1 showing an alternative method of fuel injection as contemplated by the invention.

Figure 5 is a fragmentary cross section on the line 3—3 Figure 1 illustrating another form of fuel injection according to features of the invention.

Figure 6 is a fragmentary cross section on the line 6—6 of Figure 2 illustrating a form of fuel injection from the main rotor.

Figure 7 is a sectional view of the rotor vanes on the line 7—7 of Figure 1.

Figure 8 is a sectional view of the rotor vanes on the line 8—8 of Figure 2.

Figure 9 is a sectional view of a modified form of vanes of the invention utilizing compression orifices for igniting and dispersing the fuel.

Figure 10 is a fragmentary sectional view of a form of the vanes showing a positive cooling method, the section being taken approximately on the line 10—10 of Figure 7.

The first form of the invention, disclosed in Figure 1 utilizes a tubular casing 1 with an air inlet 22 at one end and an exhaust stack 9 at the opposite end thereof, bounding three independent and coaxial rotor systems which revolve oppositely to each other. The radially innermost rotor system consists of a compressor wheel 25 having a face spline 26 at its rear or downstream side, rigidly secured by means of a central tie bolt 20 to a mating spline at the end of a shaft 42 extending from the front side of a turbine wheel 39. The intermediate rotor system is journalled on the shaft 42 by bearing segments 27 and 37 and comprises a ring-shaped compressor wheel 29 and a ring-shaped turbine wheel 35, which are joined to revolve together by a face spline 40 at the front end of a hollow shaft 41 extending from the front side of the wheel 35.

The outermost rotor system includes a ring-shaped wheel 31 furnished with combination compressor-turbine vanes 33, and journalled on the shaft 41 through bearing segments 30 and 34. The segments 27, 37, 30, and 34 are journalled on conical surfaces to afford both axial and radial alignment of rotors and may be lubricated in any conventional manner. However, due to the relatively high rotative velocity between the aforementioned rotor elements it becomes practical in certain cases to lubricate the bearing segments with air leaking between the rotors, utilizing an air wedge upon which the segments ride thereby separating the surfaces from physical contact, and this construction has been shown for simplicity. In such instance the conical bearing surfaces of the rotors abutting the segments are highly polished to avoid scuffing, and the segments are preferably composed of a synthetic gem such as sapphire, which is a monocrystalline form of aluminum oxide. This substance does not tend to weld to the metallic bearing surfaces and maintains a polished surface at elevated temperatures. A shaft 10 extends from the rear of the wheel 39 affording the support for the rotor system within the casing 1 and which likewise serves to deliver the developed shaft power to the load consumer. The shaft 10 is mounted in a ball bearing 14 and laterally stabilized by a bumper bearing ring 7 spaced axially apart therefrom in a shaft tunnel 6. The shaft tunnel 6 is secured in the casing 1 by radial struts 4 of streamlined cross section, having interior cavities 5 forming a communication between the interior of the shaft tunnel 6 and the external atmosphere for ventilation and cooling of the support structure within the heated exhaust stream. Ventilation is furnished to the rearmost portion of the tunnel 6 by vents 8 surrounding the ring 7. The dynamic characteristic of the rotor system is that of normal operation beyond the critical speed, inasmuch as the shaft 10 possesses a low flexural rigidity, therefore the rotors are self-centering during normal operation, the bearings carrying barely more than the load corresponding to the weight of the rotors alone.

The form of the invention illustrated in Figure 1 is generally intended for stationary power production, but under certain circumstances it will also be found suitable for production of power in aerial vehicles possessing a forward velocity far exceeding the speed of sound. It is therefore essential that the projected frontal area of the wheel 25 be treated in a manner to eliminate losses in supersonic flow.

Shock waves of several different types may be generated at the surface of bodies exposed to supersonic flow, and these waves follow definite laws governing the inclination angle of the wave with respect to the surface, and the change of pressure and temperature across the wave as functions of free stream velocity of the air, temperature of the air, angle of the surface, and other factors.

The wave formations utilized in the present invention are primarily of the compressive, oblique shock type. A pertinent factor is that for a given initial Mach number there may be two values of shock inclination angle and pressure rise, depending upon the surface angle exposed to the air flow, causing a given flow deflection in both cases. The constructions of the invention operate to cause the values of angle and pressure to be of lower type, which are thermally more efficient than values of the higher type, although a greater number of compressive waves are required to reach a given total pressure. The type of surface utilized for the efficient compression in the invention is characterized by a sharp leading edge followed by an angulated surface of increasing angle in small steps, to produce several weak waves at predetermined space intervals and these surfaces are discretely located to properly position these waves in the flow passages. The location of the waves is important, to surpress reflection wave losses and to maintain stable flow conditions.

The provision of a sharp conical surface merging into a relatively blunt conical surface at the forward and central portion of the air inlet 22 acts as an efficient diffuser for supersonic air induction, producing a weak oblique shock wave 43, as shown in Figure 1 emanating from the apex of the head 19 to the inner surface of the casing 1, followed by a second weak oblique shock wave 44 issuing from the juncture of the two conical surfaces of differing angle, and extending to approximately the same region as that whereat the wave 43 contacts the casing 1. The proportioning of the shock wave producing surfaces in such manner as to cause impingement of the several waves at a single point or region on the opposing surface of the flow channel reduces the loss which otherwise occurs from reflection waves at the opposing surface, and this principle is also utilized as will be later shown in the supersonic compression vanes of the invention. It is also a purpose of the invention to perform compression by a maximum number of weak shock waves in series, rather than by one strong shock wave, since the former method results in less increase of entropy, and it will be apparent that the constructions shown herewith achieve this purpose. The mathematical solutions and explanation of the laws governing the origination of the above stated waves of the weak shock type, approaching isentropic compression, and of the consequent reflection characteristics of these waves focused at a point on an opposing wall, is presented in Chapter 4 of "Aerodynamics of a Compressible Fluid" by H. W. Liepmann and A. E. Puckett, published in Galcit Aeronautical Series, June 1947. The results of the oblique shock wave compressions for various wedge angles and approach velocities are presented graphically in the auxiliary chart at the end of the subject publication, illustrating the relatively greater thermodynamic efficiency of multiple weak shock waves which tend to converge at a single region on the opposing surface of a flow channel.

The rotation of the head 19 and the spinner 21, affixed to the innermost rotor system, causes two further effects assisting efficiency of diffusion, the first effect being that the relative velocity of the cones' surface against the oncoming air reduces the initial propagation angle of the shock wave in the plane coincident with the axis, and the second being that the rotation of the cone surfaces moves the boundary layer centrifugally toward the compressor blading.

The air leaving the wave 44 enters stator vanes 23 mounted in casing bore, for guidance into supersonic compressor vanes 24 furnished on the wheel 25. Referring to Figures 1 and 7 the cross sectional contour of the vanes 24 consists of a sharp, wedge-shaped leading surface 132, joining an arcuate upper surface 134 of relatively small radius, and an arcuate lower surface 135 of larger radius terminating in a sharp trail-edge. The approaching air flow relative to the vanes 24 is along a line tangent to the surface 135 at the leading edge. This combination of surfaces, placed in cascade, projects weak oblique shock wave 131 from the leading edge toward the lower surface 135 of the next adjoining vane, directly behind the leading edge thereof. A second weak oblique shock wave 133 is generated from the juncture of the straight upper surface of the leading edge with the arcuate surface 134. The wave 133 terminates at the lower surface of the next adjoining vane directly behind or adjacent to the point of contact established by the wave 131, the flow issuing from the wave 133 being slightly less than the velocity of sound relative to the vanes 24. The direction of rotation of the vanes 24 is indicated by the arrow 151.

The flow of air initially compressed in two steps at the inlet 22, and subsequently compressed in two additional steps in the vanes 24, enters compressor vanes 28 attached to the ring 29 and revolved in the direction indicated by the arrow 150. The air enters the vanes 28 at supersonic velocity relative to the latter. In the same manner as previously described in connection with the vanes 24, a serial pair of weak light oblique shock waves 136 and 138 are generated by the wedge-shaped leading edge surfaces 137 of vanes 28 on wheel 29 and by the juncture with the arcuate upper surfaces 140, to impinge upon the lower surfaces 139 directly behind the leading edges thereof.

The air has by then become sufficiently compressed to enter the final stage of compression at supersonic relative velocity and to be thermally expanded in the combination compressor-turbine vanes 33 secured to the wheel 31, rotating in the direction indicated by the arrow 149. The vanes 33 are preferably nearly triangular in shape, attaining maximum thickness at about mid-chord. In one preferred embodiment of the invention a tangential slot 32 extending along a substantial portion of the vane length at the region of maximum thickness provides an open space for admission of injected fuel, the peculiar functions of which will be later described.

The upper surface of the vanes 33 upstream from the slot 32 is angulated by two straight surfaces 144 and 145 respectively, causing a pair of weak oblique shock waves 141 and 142 to issue from the leading edge and the juncture of surfaces 144 and 145 respectively, meeting at substantially the same point on the forward portion of lower surface 148. A third shock wave 143 of the weak oblique type is generated adjacent to the maximum thickness region of the vane section by interference arising from the forcible injection of fuel into the air stream, by one of several preferred methods to be hereinafter described.

The generation of the final oblique shock wave subject to fuel flow results in a broadening of characteristics of the machine. During light load requirements, the rotative speeds and compression ratio become less, therefore proper matching of size of flow passages to volumetric air flow calls for a relatively increased flow area and lessened flow resistance at the outlet portion of the compression system. During the latter condition the flow of fuel is relatively low, hence the shock wave 143 is not formed, or if formed it is exceedingly weak, since the fuel exerts comparatively small force against the air flow, and this effectively opens the flow area of the central portion of the flow system broadening the machine characteristics.

A second effect of the control of generation of the oblique shock wave 143 by means of fuel injection arises from the fact that the origination of the wave is accompanied by a local heating from the combustion of fuel in the air, which causes the shock wave angle to deviate from the case in which no separate heating occurs, assuming the characteristics of a wave of the weaker type. The result is a more efficient compression.

The portion of the lower surface 148 upstream from the slot 32, and the portion of the lower surface 147 downstream lie approximately in line, whereas the upper surface is arched. Therefore, except for the injection of fuel at the region of maximum thickness of the vane, severe reflection waves might occur along the aligned surfaces 147 and 148. This is averted by the fuel mass decelerating the air mass in the plane of the slots 32 at the point of injection, causing a deflection of the air stream to follow the downstream boundaries of the cascade.

Referring to Figure 1, the fuel may be supplied from any suitable source of high pressure, such as a pump 16 having an inlet 17, driven by a shaft 15 within the cavity 5. The shaft 15 is rotated by a bevel pinion 13 meshing with a bevel gear 12 which is secured to the shaft 10 and against the ball bearing 14 by a nut 11. The fuel is delivered along a conduit 18 to an annular manifold 2 in the casing 1 approximately at the plane of the slots 32.

Numerous orifices 3 extend from the manifold 2 inwardly to the bore of the casing 1, to produce finely atomized sprays 152 as shown in Figure 7 forming concentrated and closely spaced flames 153 in the downstream portion of the cascade. The orifices 3 may lean in a slightly forward direction, if desired, to oppose the rearward pressure of the air stream acting upon the sprays 152, as shown in Figure 1. The several air compression passages between compressor vanes, when viewed in cross section along the power plant axis are seen to be rapidly convergent reaching a minimum radial height adjacent to the slots 32. This causes the boundary layer at the rotor surfaces to be centrifugally moved downstream. Beyond the slots 32, the cross section of flow passage along the axis diverges rapidly. The inward radial component of the momentum of the fuel injection serves to turn the air stream in a radially inward direction to follow this divergence.

The expansion of the finely diffused fuel sprays in the air stream passing beyond the slots 32 occurs in the portion of the vane cascade bounded by the flat lower surfaces 147 and concave arcuate upper surfaces 146, and these gases of combustion leave the vanes 33 at a velocity greater than that of entrance, resulting in rotation of the wheel 31. The gases of combustion subsequently pass through turbine vanes 36 and 38 mounted on the wheel 35 and the wheel 39 respectively, for driving the compressor wheels 29 and 25, and for delivering excess power along the shaft 10.

The direction of rotation of the vanes 36 is indicated by the arrow 154 and the direction of rotation of the vanes 38 is indicated by the arrow 155.

The constructions of the invention result in a nearly instantaneous dispersion of the fuel uniformly in the air stream, in a very finely divided form. The fuel may be generally of the hydrocarbon type such as gasolene or kerosene. The surface of each particle of fuel or at least some stagnant surface area of each droplet, facing the direction of motion, necessarily possesses an elevated temperature as a result of heat generation from at least three different sources. The first source is the accumulative heat of compression of the air produced in the inlet diffuser and blading. The second source is the heat of frictional resistance of the fuel or the energy of decelerating the fuel against the air stream under shock conditions, the fuel having been brought in certain instances to a velocity over twice the velocity of sound relative to the air. A third source of heat is that of friction or impact against casing, vanes, or rotor surfaces under the very high injection pressures provided and some heat is also initially added to the fuel by conduction and flame radiation.

These heat quantities are additive, sometimes exceeding the auto-ignition temperature which results in an almost instantaneous chemical combination of the fuel in the air, resembling explosive action and the completion of combustion in a very short length of passage, since flame length is a time function of the process of chemical combination. The extremely high injection pressure of the fuel causes intense air eddy currents assisting flame propagation to any regions of fuel-air mixture which are not in a state of auto-ignition. The optimum number of fuel injection orifices provided in the casing or in the rotor is generally found to be not less than twelve per inch of power plant diameter. In the accompanying drawings the number of orifices appears to be less, and the diameter of the orifices is relatively increased in order to clearly show the position of these parts, but it is to be emphasized that the actual installation utilizes a very large number of very small orifices. The fuel injection pressure at the orifices is preferably over eleven thousand pounds per square inch, in order to effectively perform the several dynamic and chemical combination effects herein described.

The provision of three independent coaxial rotor systems one of which is connected to the load consumer, as shown in Figure 1, results in the oblique shock wave formations adjusting position and angle more favorably for maximum efficiency during variations of load, and the relationship of torque to speed is therefore broader.

The embodiment of the invention shown in Figure 2 being for jet propulsive thrust at high translational speed, does not include independent coaxial rotor systems nor stator vanes prior to the first row of rotor vanes, since a greater portion of the compression is achieved in the supersonic diffuser at the inlet of the machine, furthermore, the requirement of producing an excess shaft power above that absorbed by the compressor does not exist and therefore the flow matching of the compressor portion of the vanes to the turbine portion is less critical.

In Figure 2 a tubular casing 51 surrounds a coaxial compressor wheel 69 furnished with supersonic compressor vanes 70, with a fixed tandem engagement 77 to a wheel 78 furnished with combination compressor-turbine vanes 74. A spinner 72 comprising a relatively sharp cone 67 merging with a relatively blunt cone 68 is attached to the front side of the wheel 69, giving rise at supersonic translational speed to two serial oblique shock waves 65 and 66 respectively, terminating at the inlet bore 71 of the casing 51. In certain instances it will be found advantageous to furnish in excess of two conical surfaces of increasing angle, to produce a greater number of weak oblique shock waves, and this applies also to the impeller vanes, that the number of oblique shock waves may be increased, within limits, by a greater number of angular surface provided on these vanes. A shaft 62 extends from the rear or downstream side of the wheel 78. The shaft 62 is rotatably supported by a ball bearing 64 which is secured to the forward portion of the shaft by a nut 63 and mounted in a coaxial hollow fairing 57 at the front end thereof. The rear end of the shaft 62 is journalled in a plain bearing 58 furnished in an internal boss 59 of the fairing 57. The fairing 57 is mounted within a supersonic exhaust nozzle 55 of the casing 51 by radial struts 54.

Ventilation and cooling of the struts, fairing, and bearings is afforded by inlet air diffusers 52 communicating with the external atmosphere, leading rammed air through cavities 53 to the interior of the fairing 57. The cooling air is subsequently expelled through a rearward nozzle 56 to join with the propulsive jet issuing from the nozzle 55.

The high compression ratio attainable within the power plant of Figure 2, from the use of the supersonic blading of the invention causes a relatively high Mach number of flow to occur in the nozzle 55, therefore the nozzle need be no larger than the inlet 71 of the casing 51, which reduces external wave drag as well as raising internal efficiency. The external wave drag is further reduced by the termination of the oblique shock waves 65 and 66 within the confines of the casing 51, so that these waves cannot increase the air density outside the casing.

Fuel for operation of the power plant is admitted at an inlet 61 to flow along a conduit 60 formed in the fairing 57 and in the boss 59, which communicates with an axial bore 79 of the shaft 62. The fuel cools and lubricates the journal bearing 58. The bore 79 projects forward into the wheel 78 from which point it branches into diagonal passages 76 extending toward the vanes 74. A row of radial orifices 75 communicating with the ends of the passages 76 through a generally tangential manifold 121 shown in Figure 6 extend to the air flow passage between the vanes 74. The rotation of the wheel 78 causes fuel to be pumped by centrifugal force, so that a comparatively low pressure of the fuel entering the inlet 61 produces satisfactory operation of the power plant.

The air issuing from the wave 66 possesses a supersonic velocity as well as an elevated pressure, therefore this air may be led directly into the compressor vanes 70 without use of inlet guide vanes. Stator vanes 73 are furnished in the casing 51 only between the rotor vanes 70 and 74.

Referring to Figure 3 an injection of fuel spray 92 at approximately 11,000 pounds per square inch pressure from orifices 91 biased in the direction of motion of the wheel 31 indicated by the arrow 95, results in a radial relative motion between the fuel sprays and the air as illustrated by the arrows 93. Due to the purely radial motion between the fuel and the air, the slot boundary 94 may be radially displaced a considerable distance from the surface of the wheel 31, or the slot 32 may be entirely eliminated. This configuration achieves good dispersion of the fuel, but a limited degree of air shock front control and frictional ignition effect results.

Referring to Figure 4 fuel injection orifices 101 are radial in direction, therefore, fuel sprays 102 are likewise radial. However, due to the rotation of the wheel 31 in the direction shown by arrow 104, the relative velocity of the fuel against the air results as illustrated by arrows 103. This configuration of injection achieves good dispersion of the fuel, a strong air shock front control, and a definite frictional heating effect upon the fuel spray to cause concentration of combustion.

In Figure 5 the method of injection of a fuel spray 112 involves orifices 111, steeply sloped to oppose the direction of the wheel 31 shown by arrow 114. The resultant relative motion of the fuel against the air is nearly tangential as illustrated by arrows 113. The high relative velocity so afforded makes it feasible to utilize compression-ignition pockets 208, more thoroughly described in connection with Figure 9. A strong shock front control is obtained. However, in order to produce good distribution of fuel across the air stream, the vanes 33 must be comparatively short, or a fuel injection pressure considerably over 11,000 pounds per square inch is preferably to be utilized with the rotor tip speed exceeding 1,000 feet per second. It has been found that a velocity of the fuel injection relative to the entrained air should exceed 2,200 feet per second for best results, and in certain cases this relative velocity can be raised to over 3,000 feet per second to good advantage.

In Figure 6 the method of injection from the wheel 78 through the radial orifices 121 results in fuel sprays 123 flowing almost radially outward relative to the air, the additional required acceleration of the radially outermost particles of fuel tangentially being supplied by the air flow. The direction of rotation of the wheel 78 is represented by the arrow 122.

Figure 8 further illustrates the effect of fuel injection from the wheel 78, upon the air shock wave system. The compressor-turbine vane 74 in this case is not slotted, but is otherwise similar in shape to the vanes 33 previously described, the upper surface of vane 74 comprising straight surfaces 173 and 174, generating a serial pair of oblique shock waves 171 and 172. The orifices 75 may be located along the predetermined line of the final shock wave 179, which the fuel injection establishes. The resulting short, closely spaced, flames 175 fill only a portion of the length of the passage between upper surface 176 and the opposing lower surface 177 in order to complete the combustion.

In Figure 9 several versions of compressor-turbine vanes of the invention are shown, the first illustration being a vane 183 in connection with which fuel sprays 195 injected from the outer casing impinge in a cup 194 resulting in ejection of a fuel spray 196 of reversed direction across the air stream. The cup 194 recessed in the lower surface of the vane 183, is preferably composed of a hard material like synthetic sapphire, to minimize erosive effect. The cup assumes an elevated temperature producing a catalytic effect of combustion.

As a second illustration the next adjacent vane 184 possesses flat surfaces 188 and 189 to generate serial oblique shock waves 186 and 187. However, the final shock wave 213 is generated by a fuel spray 190 ejected normally from the vane upper surface across the air stream, by an orifice 191. The ejection force of burning fuel and air arises from fuel sprays 193 injected from the outer casing, becoming compressed in a pocket 192 in the lower surface of the vane 184, communicating with the orifice 191.

A further illustration of compression-ignition fuel injection is furnished in the next adjoining vane 185 having flat surfaces generating serial oblique shocks 197, 198, and 199. Fuel sprays 209 injected from the outer casing impinge in the pocket 208 in the lower surface of the vane 185. A reversed and forwardly directed orifice 210 communicating with the pocket 208 ejects a burning fuel-air spray 211 counter to the air flow.

The dynamic forces acting on the compressor-turbine vane causing auto-rotation of the blading and wheel about the power plant axis may be illustrated for each element of vane length measured axially, by a force vector extending from the vane surface in the tangential direction. Drag forces of air compression are represented on the vane 185 by vectors 200 extending between waves 197 and 198 and by vectors 201 between waves 198 and 199 each vector representing the differential of air pressure on either side of the vane, at each element of axial length. The abrupt rise of pressure produced across vane 185 by each successive shock wave is apparent, and the integral sum of the vectors reflects the drag to be overcome. Drag vectors 202 directly downstream from wave 199 involve acceleration of fuel mass.

During operation of the power plant of the type shown in Figure 1 at a constant speed the summation of drag vectors 200, 201, and 202 must be equal to the vectors 205 of rotative turbining effort as shown on the vane 184 of Figure 9. The turbing vectors 205 are found to commence at the intersection of a plane 203 normal to the power plant axis and slightly downstream from the region of fuel injection, with a plane 204 normal to the vane lower surface and intersecting the trailing edge of the next adjacent vane.

In the case of the power plant of Figure 2 additional drag vectors of vanes 70 must be offset, accordingly the driving effort must be greater by an amount indicated by an added set of vectors 206 as shown on the vane 184 of Figure 3.

In Figure 10 a spark plug 225 is shown in a pocket in the casing 1 downstream from the orifices 3. This plug may be utilized to initiate combustion in such applications of the machine as involve low speed launching or stationary power, or during low speed operation of the power plant. As previously described the function of the plug 225 is not required under conditions of high speed and high pressure of fuel injection.

Cooling of the compressor-turbine vane may be performed by transmission of heat by forced convection, utilizing water, sodium, chemical salt, or the like in an inverted V-shaped conduit 222 in the vane 33. The conduit 222 includes a radial leg 221 in the upstream portion of the vane and a radial leg 223 in the downstream portion of the vane. This provides a method of transferring heat from the relatively hot portion of the vane 33 downstream from the slot 32, to the cooler upstream portion.

The convection currents under the influence of centrifugal force acting upon the varying density of the coolant with temperature are illustrated by the currents 219 in the leg 221 and by the currents 218 in the leg 223, it being apparent that the heated portions of the coolant from the leg 223 seek the radially innermost portions of the conduit 222 and flow into the leg 221 to be cooled, setting up a continuous circulation. The direction of inducted air flow is illustrated by arrow 224.

The embodiments of the invention shown in Figures 1 and 2 may be started, among other methods, by air launching at a predetermined velocity, using rockets or the like, which will cause the rotors to spin, by air passing through the machine thereby initiating operation of the process of power or jet thrust production. The machine shown in Figure 1 can be started by revolving the shaft 10 with a rapid acceleration of speed from standstill, using any customary starting power source, in which case the rotors not directly connected to the shaft 10, will gradually pick up speed in the correct direction of motion, due to the air being forced through the machine.

In the foregoing descriptions a gas turbine of the axial flow supersonic type has been set forth in which the essential elements for attainment of high performance have been greatly simplified and reduced in required number in a novel manner. The invention may in fact assume many different forms, for example, it is not necessary that air be the selected working fluid nor that hydrocarbon compounds be used for fuel. The invention contemplates such alternatives as may arise from the process of using any compressible fluid susceptible to formation of oblique compressive shock waves and capable of being heated by chemical reaction or by any concentrated external heating means located adjacent to the juncture of the convergent flow passage with the divergent flow passage affecting the shock wave configuration of the compressible fluid flowing in the blading, to produce shaft power. Some of the above applications arise in connection with industrial process of chemical plants or oil refineries, and the utility of the invention pertains also to closed circuit power plants as well as to open cycle power plants. For example, principles of the invention would be applicable to a closed circuit power plant utilizing butane gas in the working fluid recirculation system, with an injection of hydrogen peroxide. Furthermore principles of the invention may be applied to pump rotors in general, so long as these rotors are furnished with passages entraining supersonic flow into which flow may be introduced another fluid under regulation to establish a discrete system of compressive shock, merely exerting an arbitrary control of the extent of compression produced in these rotors.

I desire to emphasize that various modifications may be resorted to in a manner limited only by a just interpretation of the following claims.

I claim:

1. In combination in a power plant, a gas turbine rotor, impeller vanes furnished on said rotor, said vanes forming passages for flow of air therethrough to be compressed, said passages being supplied air at a supersonic velocity relative to the entrance thereof, said vanes having wedge-shaped leading edges, and a portion of said vanes downstream being expanded in thickness at an angle greater than that of said leading edges to produce a predetermined series of compressive shocks in said air.

2. Apparatus as defined in claim 1, wherein means is provided for injection of fuel adjacent to the exit of said downstream portion of said vanes to produce a final compressive shock wave in the air stream.

3. In combination in a power plant, a gas turbine rotor, impeller vanes furnished on said rotor, said vanes forming passages for flow of air therethrough, said passages having a convergent portion connected to a divergent portion, said convergent portion receiving air at a supersonic velocity relative to said vanes, generally tangential openings in said vanes adjacent to the juncture of said convergent and said divergent portions, and means for injecting fuel into said openings.

4. In combination in a power plant, a gas turbine rotor, impeller vanes furnished on said rotor, said vanes forming passages for flow of air therethrough, said vanes having wedge-shaped leading edges and a portion of said vanes downstream being expanded in thickness at an angle greater than that of said leading edges, a turbine casing lying opposite the ends of said vanes, each of said passages having a convergent portion connected to a divergent portion, said convergent portions receiving air at supersonic velocity relative to said vanes, and injection orifices in said casing arranged to force fuel between said vanes adjacent to the juncture of said convergent portions with said divergent portions causing compressive air shock waves in multiple.

5. In combination in a power plant, a gas turbine rotor, impeller vanes furished on said rotor, said vanes forming passages for flow of air therethrough, said passages having a convergent portion connected to a divergent portion, said convergent portion receiving air at a supersonic velocity relative to said vanes, said vanes being encompassed by a turbine casing, injection orifices in said casing arranged to inject fuel into said passages, and hardened inserts in said vanes in the plane of said orifices.

6. In combination in a power plant, a gas turbine rotor, impeller vanes furnished on said rotor, said vanes forming passages for flow of air therethrough, the inlet portion of said passage being convergent and the outlet portion of said passage being divergent, means for injecting fuel into the air stream adjacent to the juncture of said convergent and said divergent portions, said vanes containing at least one cavity interiorly thereof extending continuously along said convergent and said divergent portions of said passage, said cavity containing a heat transferring liquid.

7. In combination in a power plant, a gas turbine rotor, impeller vanes furnished on said rotor, said vanes forming passages for flow of air therethrough comprising a compression region and an expansion region, means for injecting fuel into said passage adjacent to the juncture of said compression and said expansion regions, said vanes having an airfoil section composed of a substantially straight line along the under surface and the upper surface being composed of a generally concave and angulated line extending from the leading edge and joined to a concave line extending to the trailing edge of said airfoil, said passages receiving air at a supersonic velocity relative to said vanes.

8. In combintion in a power plant, a gas turbine rotor system comprising a spool-shaped rotor and a ring supported in counter-rotating relationship at the medial portion of said spool-shaped rotor, said ring having impeller vanes at its periphery forming passages for flow of air therethrough, the inlet portion of said passages being convergent and the outlet portion of said passages being divergent, means to heat said air directly adjacent to the juncture of said convergent and said divergent portions, said spool-shaped rotor being furnished with supersonic airfoil vanes for compression of air entering said inlet portion and with supersonic turbine buckets at the discharge of said outlet portion.

9. In combination in a gas turbine power plant, an elongated rotor system tapering to a smaller diameter at either end and furnished with rows of supersonic impeller vanes between said ends, a generally tubular casing surrounding said vanes, a row of impeller vanes at the largest diameter portion of said rotor system forming passages for flow of air therethrough, said vanes having wedge-shaped leading edges and a portion of said vanes downstream being expanded in thickness at an angle greater than that of said leading edges, said passages having a convergent portion communicating directly with a divergent portion, injection orifices in said casing arranged to force fuel into said passages at the juncture of said convergent and said divergent portions, and a support extending from said casing to said rotor system journalling the latter.

10. Apparatus as defined in claim 4 wherein said vanes are furnished with curved pockets in the plane of said injection orifices.

11. In combination in a power plant, a gas turbine rotor, impeller vanes furnished on said rotor, said vanes forming passages for flow of air therethrough to be compressed, said passages being supplied air at a supersonic velocity relative to the entrance thereof and having a convergent inlet portion and a divergent outlet portion, each of said passages communicating with a row of injection orifices for admission of fuel into said airstream, and each of said rows being parallel to a predetermined line of compressive shock of the air in said passages, said vanes having wedge-shaped leading edges, and a portion of said vanes downstream being expanded in thickness at an angle greater than that of said leading edges to produce a predetermined series of compressive shocks in said air.

12. In a gas turbine, a generally tubular casing, a rotor mounted for rotation in the casing and providing a convergent inlet passageway with said casing opening into a rearwardly extending divergent passageway, said rotor having independently rotatable sets of blading thereon extending into said passageways for fluid-flow between the rotor and the casing, fuel admission means provided adjacent the junction of said convergent and divergent passageways and means for injecting fuel through said fuel admission means at a velocity relative to that of the air passing through said convergent passageway of at least 2,200 feet per second.

13. In combination in a power plant, a gas turbine rotor, impeller vanes furnished on said rotor, said vanes forming passages for flow of a compressible fluid therethrough admitted to said passages at supersonic velocity relative to said vanes, said vanes having wedge-shaped leading edges originating oblique shock waves of the weak type in said compressible fluid, an injection nozzle for injecting a second fluid into said compressible fluid within said passages originating subsequent shock waves in said compressible fluid, and said oblique waves being oriented to meet said subsequent waves at a wall of said passages, surpressing compressive shock losses.

NATHAN C. PRICE.

REFERENCES CITED

The following references are of record in the file of this patent:

UNITED STATES PATENTS

| Number | Name | Date |
|---|---|---|
| 2,243,467 | Jendrassik | May 27, 1941 |
| 2,410,538 | Walton | Nov. 5, 1946 |
| 2,430,398 | Heppner | Nov. 4, 1947 |

FOREIGN PATENTS

| Number | Country | Date |
|---|---|---|
| 219,485 | Switzerland | May 16, 1942 |